United States Patent
Kang et al.

(10) Patent No.: US 7,170,191 B2
(45) Date of Patent: Jan. 30, 2007

(54) ELECTRICITY GENERATING AND AIR CONDITIONING SYSTEM WITH WATER HEATER

(75) Inventors: Seung Tak Kang, Seoul (KR); Chang Min Choi, Seoul-si (KR); Won Jae Choi, Seoul (KR); Hyung Soo Lim, Seoul (KR); Yoon Jei Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/039,936

(22) Filed: Jan. 24, 2005

(65) Prior Publication Data

US 2006/0038404 A1 Feb. 23, 2006

(30) Foreign Application Priority Data

Aug. 17, 2004 (KR) .................. 10-2004-0064819

(51) Int. Cl.
  *F25B 27/00* (2006.01)
(52) U.S. Cl. .......................................................... 290/2
(58) Field of Classification Search .................. None
  See application file for complete search history.

(56) References Cited

U.S. PATENT DOCUMENTS

| | | | | |
|---|---|---|---|---|
| 2,313,439 A | * | 3/1943 | Horton | 165/251 |
| 2,355,040 A | * | 8/1944 | Alexander et al. | 165/256 |
| 3,078,689 A | * | 2/1963 | Japhet | 62/324.3 |
| 3,424,916 A | * | 1/1969 | Fenley | 290/40 R |
| 3,559,724 A | * | 2/1971 | Wilkinson | 165/259 |
| 4,347,702 A | * | 9/1982 | Tawse | 60/618 |
| 4,517,799 A | * | 5/1985 | Hanaoka et al. | 62/323.1 |
| 4,907,738 A | * | 3/1990 | Harris | 237/2 B |
| 5,003,788 A | * | 4/1991 | Fischer | 62/238.7 |
| 5,020,320 A | * | 6/1991 | Talbert et al. | 62/238.7 |
| 5,029,449 A | * | 7/1991 | Wilkinson | 62/175 |
| 5,429,179 A | * | 7/1995 | Klausing | 165/240 |
| 5,689,962 A | * | 11/1997 | Rafalovich | 62/90 |
| 6,425,257 B1 | * | 7/2002 | Ohseki et al. | 62/323.1 |
| 6,843,312 B2 | * | 1/2005 | Burk et al. | 165/240 |
| 6,966,185 B2 | * | 11/2005 | Shimada et al. | 60/698 |
| 2006/0037742 A1 | * | 2/2006 | Kim et al. | 165/201 |

FOREIGN PATENT DOCUMENTS

GB  2116301 A  * 9/1983

* cited by examiner

*Primary Examiner*—Joseph Waks
(74) *Attorney, Agent, or Firm*—Birch, Stewart, Kolasch & Birch, LLP

(57) ABSTRACT

A cogeneration system includes an engine, a generator connected to an output shaft of the engine to generate electricity, a heat pump type air conditioner, which uses the electricity generated from the generator, and includes a compressor, a directional valve, an outdoor heat exchanger, an expansion device, and an indoor heat exchanger, a fluid-heating heat exchanger to heat a fluid, and a waste heat recovering means to supply waste heat of the engine to the heat pump type air conditioner or to the fluid-heating heat exchanger, so that the system exhibits a high energy efficiency.

29 Claims, 8 Drawing Sheets

ELECTRICITY GENERATING AND AIR CONDITIONING SYSTEM WITH WATER HEATER

BACKGROUND OF THE INVENTION

1. Field of the Invention

The present invention relates to an electricity generating and air conditioning system with a water heater, and, more particularly, to an electricity generating and air conditioning system with a water heater in which exhaust gas or cooling water of an engine is used to achieve an enhancement in air conditioning efficiency.

2. Description of the Related Art

In general, electricity generating and air conditioning systems generate electricity by use of a rotating force outputted from an engine, and operate an air conditioner by use of the generated electricity. Such electricity generating and air conditioning systems are mainly used for multi-type air conditioners or large-scale air conditioners.

Such electricity generating and air conditioning systems include an engine, a generator connected to an output shaft of the engine to generate electricity, an air conditioner, which is operated, using the electricity generated from the generator, and a water heater, which heats water, using waste heat of the engine, to supply hot water.

However, such a conventional electricity generating and air conditioning system has a problem in that waste heat of exhaust gas discharged from an engine is not used for an enhancement in the heating performance of the air conditioner, but is used only for supply of hot water, so that the system exhibits a low energy efficiency.

SUMMARY OF THE INVENTION

The present invention has been made in view of the above-mentioned problems, and it is an object of the invention to provide an electricity generating and air conditioning system with a water heater in which waste heat of an engine is used not only to enhance the heating performance of an air conditioner, but also to supply hot water, so that the system exhibits a high energy efficiency.

In accordance with one aspect, the present invention provides an electricity generating and air conditioning system comprising: an engine; a generator connected to an output shaft of the engine to generate electricity; a heat pump type air conditioner, which uses the electricity generated from the generator, and comprises a compressor, a directional valve, an outdoor heat exchanger, an expansion device, and an indoor heat exchanger; a water-heating heat exchanger to heat water; and waste heat recovering means to supply waste heat of the engine to the heat pump type air conditioner or to the water-heating heat exchanger.

The waste heat recovering means may comprise a cooling water heat exchanger to absorb heat from cooling water used to cool the engine, an exhaust gas heat exchanger to absorb heat from exhaust gas discharged from the engine, and heat transfer means to transfer heat from at least one of the cooling water heat exchanger and the exhaust gas heat exchanger to the water-heating heat exchanger during a cooling operation of the heat pump type air conditioner, and to transfer heat from at least one of the cooling water heat exchanger and the exhaust gas heat exchanger to the heat pump type air conditioner during a heating operation of the heat pump type air conditioner.

The waste heat recovering means may further comprise a pre-heater, which is heated by the heat transfer means, to pre-heat outdoor air blown toward the outdoor heat exchanger.

In accordance with another aspect, the present invention provides an electricity generating and air conditioning system comprising: an engine; a generator connected to an output shaft of the engine to generate electricity; a cooling water heat exchanger to absorb heat from cooling water used to cool the engine; an exhaust gas heat exchanger to absorb heat from exhaust gas discharged from the engine; a heat pump type air conditioner, which uses the electricity generated from the generator, and comprises a compressor, a directional valve, an outdoor heat exchanger, an expansion device, and an indoor heat exchanger; a water-heating heat exchanger to heat water; a pre-heater to pre-heat outdoor air blown toward the outdoor heat exchanger; and heat transfer means to transfer heat from at least one of the cooling water heat exchanger and the exhaust gas heat exchanger to the water-heating heat exchanger during a cooling operation of the heat pump type air conditioner, and to transfer heat from at least one of the cooling water heat exchanger and the exhaust gas heat exchanger to the pre-heater during a heating operation of the heat pump type air conditioner.

In accordance with another aspect, the present invention provides an electricity generating and air conditioning system comprising: an engine; a generator connected to an output shaft of the engine to generate electricity; a cooling water heat exchanger to absorb heat from cooling water used to cool the engine; an exhaust gas heat exchanger to absorb heat from exhaust gas discharged from the engine; a heat pump type air conditioner, which uses the electricity generated from the generator, and comprises an outdoor unit including a compressor, a directional valve, an outdoor heat exchanger, and an expansion device, and an indoor unit including an indoor heat exchanger; a water-heating heat exchanger to heat water; a pre-heater to pre-heat outdoor air blown toward the outdoor heat exchanger; and heat transfer means to transfer heat from at least one of the cooling water heat exchanger and the exhaust gas heat exchanger to the water-heating heat exchanger during a cooling operation of the heat pump type air conditioner, and to transfer heat from at least one of the cooling water heat exchanger and the exhaust gas heat exchanger to the pre-heater during a heating operation of the heat pump type air conditioner.

The heat transfer means may comprise a pre-heater circulation conduit to guide a heat medium to be circulated through the cooling water heat exchanger, the exhaust gas heat exchanger, and the pre-heater, and a water-heating heat exchanger circulation conduit to guide the heat medium to be circulated through the cooling water heat exchanger, the exhaust gas heat exchanger, and the water-heating heat exchanger.

The water-heating heat exchanger circulation conduit may be branched from the pre-heater circulation conduit.

The heat transfer means may further comprise a heat medium circulation pump to pump the heat medium, and thus, to circulate the heat medium through the pre-heater circulation conduit or through the water-heating heat exchanger circulation conduit.

The heat transfer means may further comprise a control valve to alternately open/close the pre-heater circulation conduit and the water-heating heat exchanger circulation conduit, and thus, to circulate the heat medium through a selected one of the pre-heater circulation conduit and the water-heating heat exchanger circulation conduit.

The heat transfer means may further comprise a controller to control the control valve to operate, during a cooling operation of the heat pump type air conditioner, in a cooling mode in which the water-heating heat exchanger circulation conduit is opened, and the pre-heater circulation conduit is closed, and to control the control valve to operate, during a heating operation of the heat pump type air conditioner, in a heating mode in which the water-heating heat exchanger circulation conduit is closed, and the pre-heater circulation conduit is opened.

At least one of the engine, the generator, the indoor heat exchanger, and the outdoor heat exchanger may comprise a plurality of ones.

The electricity generating and air conditioning system according to the present invention has an advantage in that the waste heat of the engine is used to heat water during a cooling operation of the heat pump type air conditioner, and is used to achieve an enhancement in heating performance during a heating operation of the heat pump type air conditioner, so that it is possible to achieve a reduction in heating load, and to maximize the efficiency of the system.

The electricity generating and air conditioning system according to the present invention also has advantages in that the waste heat of cooling water or exhaust gas of the engine is used to pre-heat air blown to the outdoor heat exchanger during the heating operation of the heat pump type air conditioner, so that it is possible to prevent the outdoor heat exchanger from being frosted, and to rapidly cope with the heating load of the heat pump type air conditioner.

In addition, the electricity generating and air conditioning system according to the present invention has advantages in that the water-heating heat exchanger circulation conduit is branched from the pre-heater circulation conduit such that only one heat medium conduit is provided for both the cooling water heat exchanger and the exhaust gas heat exchanger, so that the circulation conduit structure for the cooling water heat exchanger and exhaust gas heat exchanger is simple, and the number of control valves to be used for the circulation of the heat medium is minimized.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Hereinafter, exemplary embodiments of an electricity generating and air conditioning system according to the present invention will be described with reference to the annexed drawings.

Figure 1:
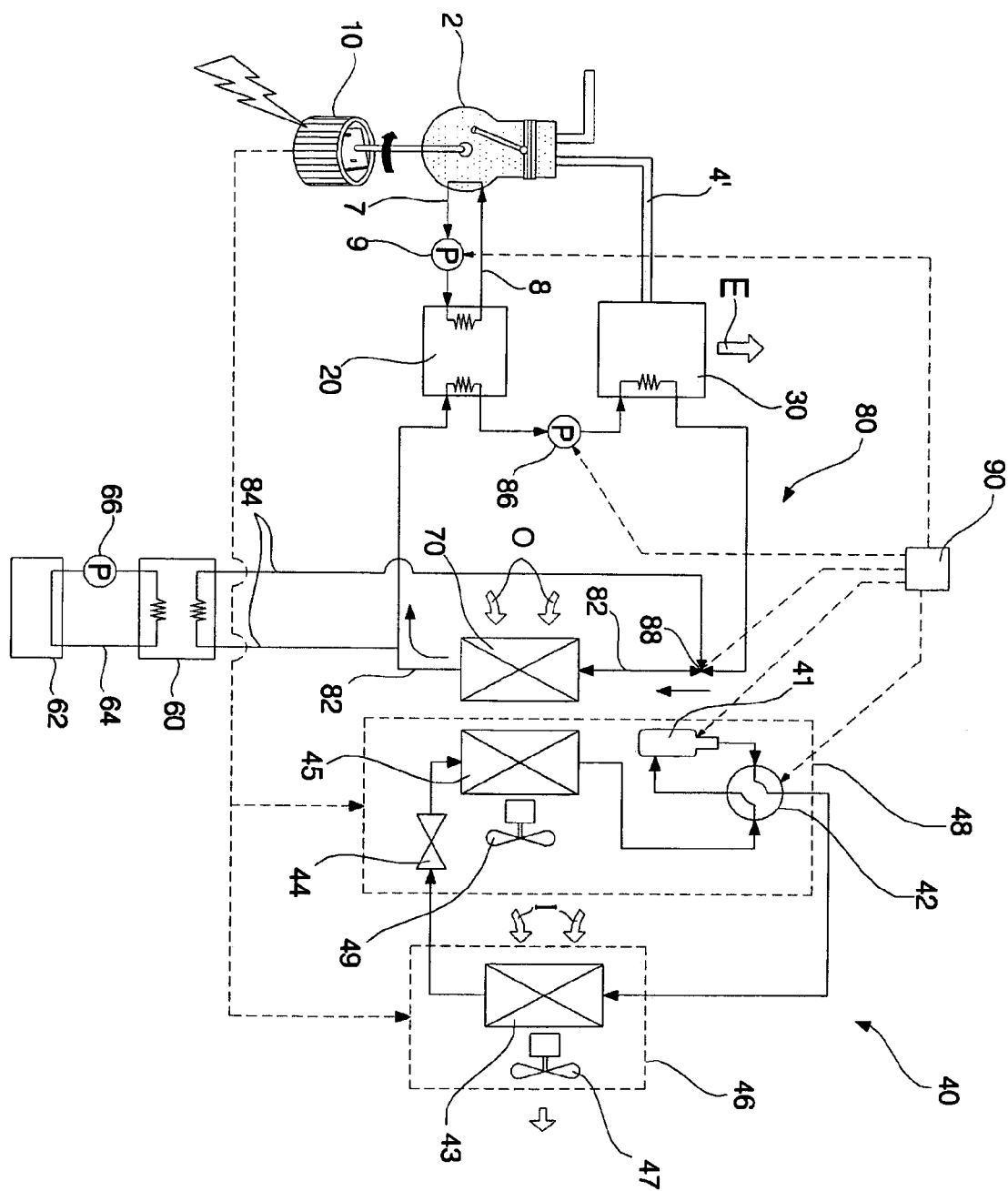
FIG. 1 is a schematic diagram of an electricity generating and air conditioning system with a water heater according to a first embodiment of the present invention, illustrating a state in which the system operates in a heating mode.
Figure 2:
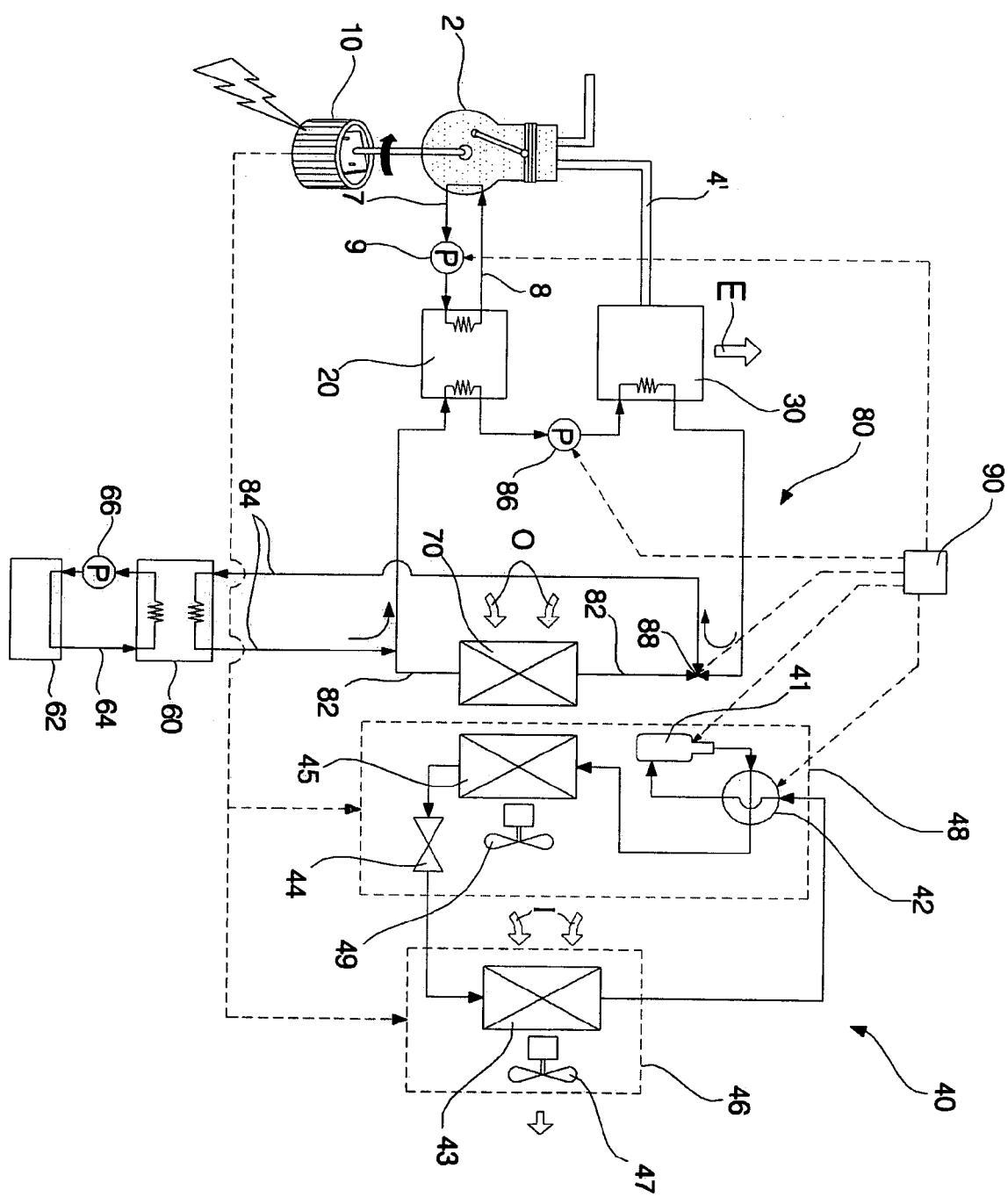
FIG. 2 is a schematic diagram of the electricity generating and air conditioning system with the water heater according to the first embodiment of the present invention, illustrating a state in which the system operates in a cooling mode.

FIG. 1 is a schematic diagram of an electricity generating and air conditioning system with a water heater according to a first embodiment of the present invention, illustrating a state in which the system operates in a heating mode. FIG. 2 is a schematic diagram of the electricity generating and air conditioning system with the water heater according to the first embodiment of the present invention, illustrating a state in which the system operates in a cooling mode.

As shown in FIGS. 1 and 2, the electricity generating and air conditioning system includes an engine 2, a generator 10 connected to an output shaft of the engine 2 to generate electricity, a cooling water heat exchanger 20 to absorb heat from cooling water used to cool the engine 2, and an exhaust gas heat exchanger 30 to absorb heat from exhaust gas discharged from the engine 2. The electricity generating and air conditioning system also includes a heat pump type air conditioner 40, which uses the electricity generated from the generator 10, and includes a compressor 41, a directional valve 42, an indoor heat exchanger 43, an expansion device 44, and an outdoor heat exchanger 45. The electricity generating and air conditioning system further includes a water-heating heat exchanger 60 to heat water, a pre-heater 70 to pre-heat outdoor air blown toward the outdoor heat exchanger 45, and a heat transfer means 80 to transfer heat from at least one of the cooling water heat exchanger 20 and exhaust gas heat exchanger 30 to the water-heating heat exchanger 60 during a cooling operation of the heat pump type air conditioner 40, and to transfer heat from at least one of the cooling water heat exchanger 20 and exhaust gas heat exchanger 30 to the pre-heater 70 during a heating operation of the heat pump type air conditioner 40.

The engine 2 includes a combustion chamber defined in the interior of the engine 2.

A fuel tube 3 and an exhaust tube 4 are connected to the engine 2. The fuel tube 3 is adapted to supply fuel such as liquefied gas or liquefied petroleum gas into the combustion chamber. The exhaust tube 4 is adapted to guide exhaust gas discharged from the combustion chamber.

The exhaust tube 4 is arranged between the engine 2 and the exhaust gas heat exchanger 30 to guide exhaust gas E discharged from the engine 2 to the exhaust gas heat exchanger 30.

The cooling water heat exchanger 20 is connected to the engine 2 via cooling water circulation conduits 7 and 8 so that the cooling water, which is heated while cooling the engine 2, transfers heat to the cooling water heat exchanger 20 while passing through the cooling water heat exchanger 20, and is then again circulated into the engine 2.

A cooling water circulation pump 9 is connected to one of the engine 2, cooling water heat exchanger 20, and cooling water circulation conduits 7 and 8.

The generator 10 may be an AC generator or a DC generator.

In a heating operation of the heat pump type air conditioner 40, refrigerant, which has been compressed in the compressor 41, flows through the directional valve 42, indoor heat exchanger 43, expansion device 44, outdoor heat exchanger 45, and directional valve 42, in this order, and then enters the compressor 41, as shown in FIG. 1. Thus, the refrigerant is circulated. In this operation, the outdoor heat exchanger 45 functions as an evaporator, whereas the indoor heat exchanger 43 functions as a condenser, and thus, discharges heat to indoor air.

On the other hand, in a cooling operation of the air conditioner 40, refrigerant, which has been compressed in the compressor 41, flows through the directional valve 42, outdoor heat exchanger 45, expansion device 44, indoor heat exchanger 43, and directional valve 42, in this order, and then enters the compressor 41, as shown in FIG. 2. Thus, the refrigerant is circulated. In this operation, the outdoor heat exchanger 45 functions as a condenser, whereas the indoor heat exchanger 43 functions as an evaporator, and thus, absorbs heat from indoor air.

The heat pump type air conditioner 40 further includes an indoor fan or blower 47 to blow indoor air I to the indoor heat exchanger 43. The indoor heat exchanger 43 and indoor fan 47 constitute an indoor unit 46 of the heat pump type air conditioner 40.

The heat pump type air conditioner 40 further includes an outdoor fan or blower 49 to blow outdoor air O to the outdoor heat exchanger 45. The compressor 41, directional valve 42, expansion device 44, outdoor heat exchanger 45, and outdoor fan 49 constitute an outdoor unit 48 of the heat pump type air conditioner 40.

The water-heating heat exchanger 60 is connected to a hot water consumer 62, which uses hot water, via a hot water conduit 64.

A hot water pump 66 is arranged at one of the water-heating heat exchanger 60, hot water consumer 62, and hot water conduit 64, to circulate or supply water heated by the water-heating heat exchanger 60 into the hot water consumer 62.

The pre-heater 70 is arranged upstream from the outdoor heat exchanger 45 with respect to a flowing direction of outdoor air O blown toward the outdoor heat exchanger 45, to pre-heat the outdoor air O.

The heat transfer means 80 may be configured to absorb waste heat from only one of the cooling water heat exchanger 20 and exhaust gas heat exchanger 30. Alternatively, the heat transfer means 80 may be configured to absorb waste heat from both the cooling water heat exchanger 20 and the exhaust gas heat exchanger 30 in an independent manner. The following description will be given only in conjunction with the case in which the heat transfer means 80 absorbs waste heat from both the cooling water heat exchanger 20 and the exhaust gas heat exchanger 30 in an independent manner.

The heat transfer means 80 includes a pre-heater circulation conduit 82 to guide a heat medium to be circulated through the cooling water heat exchanger 20, exhaust gas heat exchanger 30, and pre-heater 70, and a water-heating heat exchanger circulation conduit 84 to guide the heat medium to be circulated through the cooling water heat exchanger 20, exhaust gas heat exchanger 30, and water-heating heat exchanger 60.

The pre-heater circulation conduit 82 and water-heating heat exchanger circulation conduit 84 of the heat transfer means 80 may be independent of each other such that a first heat medium is circulated through the pre-heater circulation conduit 82, and a second heat medium is circulated through the water-heating heat exchanger circulation conduit 84. Alternatively, the water-heating heat exchanger circulation conduit 84 may be branched from the pre-heater circulation conduit 82 such that a heat medium is selectively circulated through the pre-heater circulation conduit 82 or water-heating heat exchanger circulation conduit 84. The following description will be given only in conjunction with the case in which the water-heating heat exchanger circulation conduit 84 is branched from the pre-heater circulation conduit 82.

The heat transfer means 80 further includes a heat medium circulation pump 86 to pump the heat medium, and thus, to circulate the heat medium through the pre-heater circulation conduit 82 or water-heating heat exchanger circulation conduit 84.

The heat transfer means 80 further includes a control valve 88 to alternately open/close the pre-heater circulation conduit 82 and water-heating heat exchanger circulation conduit 84.

Although only one control valve 88 is arranged at a connection region where the water-heating heat exchanger circulation conduit 84 is branched from the pre-heater circulation conduit 82, to alternately open/close the pre-heater circulation conduit 82 and water-heating heat exchanger circulation conduit 84, in the illustrated case, two control valves 88 may be arranged at both the pre-heater circulation conduit 82 and water-heating heat exchanger circulation conduit 84, to open/close the conduits 82 and 84 in an independent manner, respectively. The following description will be given only in conjunction with the case in which only one control valve 88 is arranged to alternately open/close the pre-heater circulation conduit 82 and water-heating heat exchanger circulation conduit 84.

The heat transfer means 80 further includes a controller 90 to control the control valve 88 to operate, during a cooling operation of the heat pump type air conditioner 40, in a cooling mode in which the water-heating heat exchanger circulation conduit 84 is opened, and the pre-heater circulation conduit 82 is closed, and to control the control valve 88 to operate, during a heating operation of the heat pump type air conditioner 40, in a heating mode in which the water-heating heat exchanger circulation conduit 84 is closed, and the pre-heater circulation conduit 82 is opened.

Hereinafter, operation of the system having the above-described arrangement will be described.

When fuel is supplied to the engine 2 via the fuel tube 3, and the engine 2 is subsequently driven, the output shaft of the engine 2 is rotated, thereby causing the generator 10 to generate electricity.

Exhaust gas, which is discharged from the engine 2 during the operation of the engine 2, is fed to the exhaust gas heat exchanger 30, and is then discharged to the atmosphere after releasing its heat into the exhaust gas heat exchanger 30.

During the operation of the engine 2, the cooling water circulation pump 9 operates. In accordance with the operation of the cooling water circulation pump 9, cooling water, which is heated while cooling the engine 2, is fed to the cooling water heat exchanger 20 via the cooling water circulation conduit 7, and is then circulated into the engine 2 via the cooling water circulation conduit 8 after releasing its heat into the cooling water heat exchanger 20.

When the heat pump type air conditioner 40 operates in the heating mode, the compressor 41 is driven by the electricity generated from the generator 10. In this case, the directional valve 42 is switched to a heating mode, and the heat medium circulation pump 86 is driven. Also, the control valve 88 is switched to a heating mode.

When the directional valve 42 is switched to the heating mode, and the compressor 41 operates, as shown in FIG. 1, the compressor 41 compresses low-temperature and low-pressure refrigerant gas, thereby changing the refrigerant gas into a high-temperature and high-pressure state. The high-temperature and high-pressure refrigerant gas is fed into the indoor heat exchanger 43 via the directional valve 42, and discharges its heat to indoor air while passing through the indoor heat exchanger 43, so that the refrigerant gas is condensed.

Subsequently, the condensed refrigerant is expanded while passing through the expansion device 44, and is then fed into the outdoor heat exchanger 45. The expanded refrigerant absorbs heat from outdoor air while passing through the outdoor heat exchanger 45, so that the refrigerant is evaporated.

The evaporated refrigerant is subsequently circulated into the compressor 41 via the directional valve 42. As the circulation of the refrigerant is repeated, a confined space, in which indoor air is circulated, is continuously heated.

When the control valve 88 is switched to the heating mode, and the heat medium circulation pump 86 is driven, the heat medium heated by the cooling water heat exchanger 20 is re-heated by the exhaust gas heat exchanger 30, and is then guided to the pre-heater circulation conduit 82, and thus, the pre-heater 70, by the control valve 88. After releasing heat into the pre-heater 70, that is, heating the pre-heater 70, the heat medium is circulated into the cooling water heat exchanger 20. As the circulation of the heat medium is repeated, the pre-heater 70 is continuously heated.

Meanwhile, the pre-heater 70, which is heated as described above, heats air blown toward the outdoor heat exchanger 45, so that the outdoor heat exchanger 45 is not frosted.

On the other hand, when the heat pump type air conditioner operates in a cooling mode, the compressor 41 is driven by the electricity generated from the generator 10. In this case, the directional valve 42 is switched to the cooling mode, and the heat medium circulation pump 86 is driven. Also, the control valve 88 is switched to the cooling mode.

When the directional valve 42 is switched to the cooling mode, and the compressor 41 operates, as shown in FIG. 2, the compressor 41 compresses low-temperature and low-pressure refrigerant gas, thereby changing the refrigerant gas into a high-temperature and high-pressure state. The high-temperature and high-pressure refrigerant gas is fed into the outdoor heat exchanger 45 via the directional valve 42, and discharges its heat to outdoor air while passing through the outdoor heat exchanger 45, so that the refrigerant gas is condensed.

Subsequently, the condensed refrigerant is expanded while passing through the expansion device 44, and is then fed into the indoor heat exchanger 43. The expanded refrigerant absorbs heat from indoor air while passing through the indoor heat exchanger 43, so that the refrigerant is evaporated.

The evaporated refrigerant is circulated into the compressor 41 via the directional valve 42. As the circulation of the refrigerant is repeated, the confined space is continuously cooled.

Meanwhile, when the control valve 88 is switched to the cooling mode, and the heat medium circulation pump 86 operates, the heat medium heated by the cooling water heat exchanger 20 is re-heated by the exhaust gas heat exchanger 30, and is then guided to the water-heating heat exchanger circulation conduit 84, and thus, the water-heating heat exchanger 60, by the control valve 88. After releasing heat into the water-heating heat exchanger 60, that is, heating the water-heating heat exchanger 60, the heat medium is circulated into the cooling water heat exchanger 20. As the circulation of the heat medium is repeated, the water-heating heat exchanger 60 is continuously heated.

Figure 3:
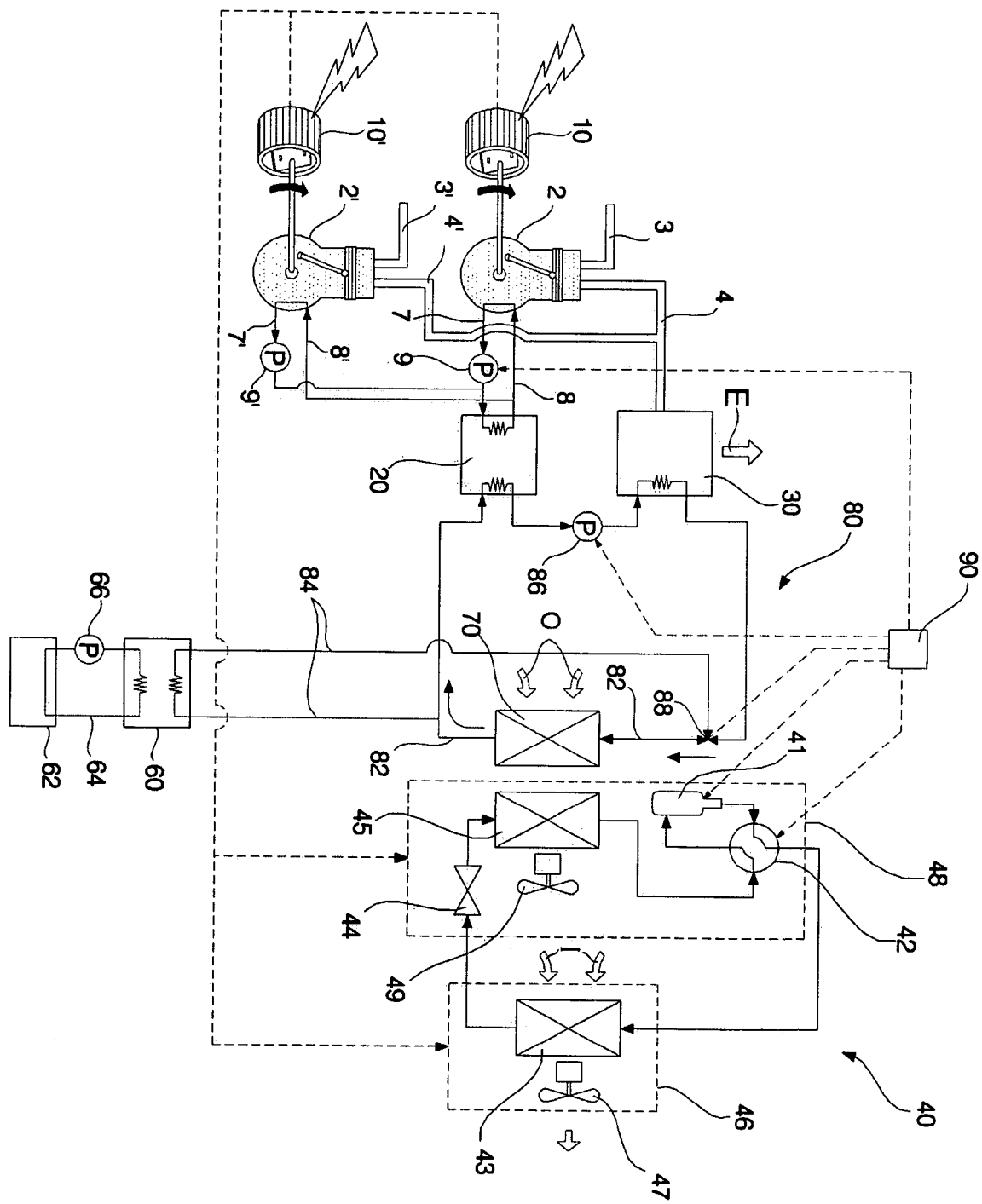
FIG. 3 is a schematic diagram of an electricity generating and air conditioning system with a water heater according to a second embodiment of the present invention, illustrating a state in which the system operates in a heating mode.
Figure 4:
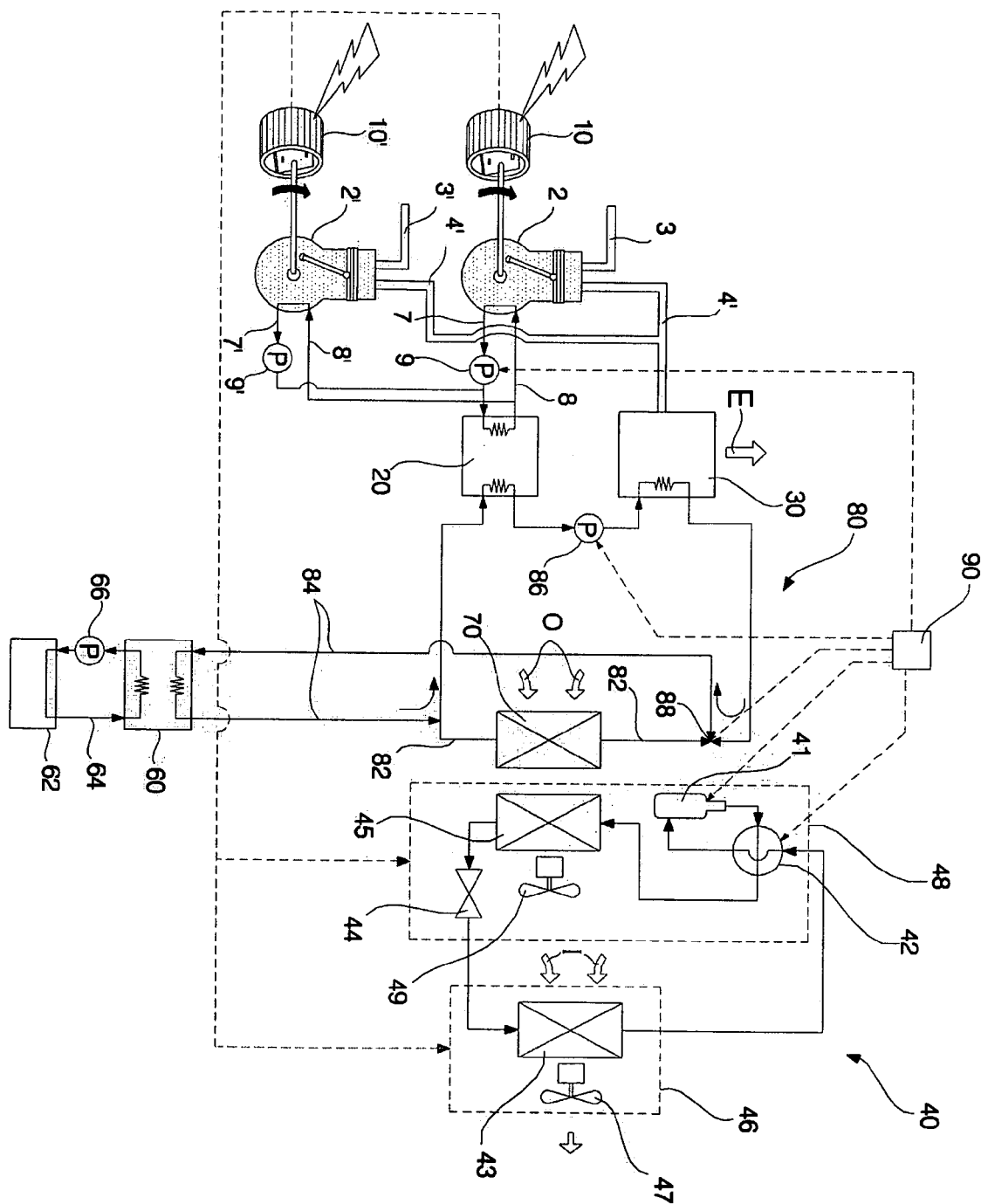
FIG. 4 is a schematic diagram of the electricity generating and air conditioning system with the water heater according to the second embodiment of the present invention, illustrating a state in which the system operates in a cooling mode.

FIG. 3 is a schematic diagram of an electricity generating and air conditioning system with a water heater according to a second embodiment of the present invention, illustrating a state in which the system operates in a heating mode. FIG. 4 is a schematic diagram of the electricity generating and air conditioning system with the water heater according to the second embodiment of the present invention, illustrating a state in which the system operates in a cooling mode.

As shown in FIGS. 3 and 4, the electricity generating and air conditioning system includes a plurality of engines 2, 2'. . . . The electricity generating and air conditioning system also includes a plurality of generators 10, 10'. . . connected to respective shafts of the engines 2, 2'. . . .

One or more of the engines 2, 2'. . . operate in accordance with the load to be cooled or heated.

Fuel tubes 3, 3'. . . and exhaust tubes 4, 4'. . . are connected to respective engines 2, 2'. . . . Also, pairs of cooling water circulation conduits 7 and 8, 7' and 8'. . . are connected to respective engines 2, 2'. . . .

The exhaust gas tubes 4, 4'. . . are connected in parallel.

The cooling water circulation conduits 7 and 8, 7' and 8'. . . are connected in parallel.

Cooling water circulation pumps 9, 9'. . . are directly connected to the cooling water circulation conduit 7 or 8, cooling water circulation conduit 7' or 8'. . . , respectively.

The electricity generating and air conditioning system of the second embodiment has the same configuration and functions as those of the first embodiment, except for the engines 2, 2'. . . and generators 10, 10'. . . . Accordingly, the constituent elements of the second embodiment respectively corresponding to those of the first embodiment are designated by the same reference numerals, and no detailed description thereof will be given.

Figure 5:
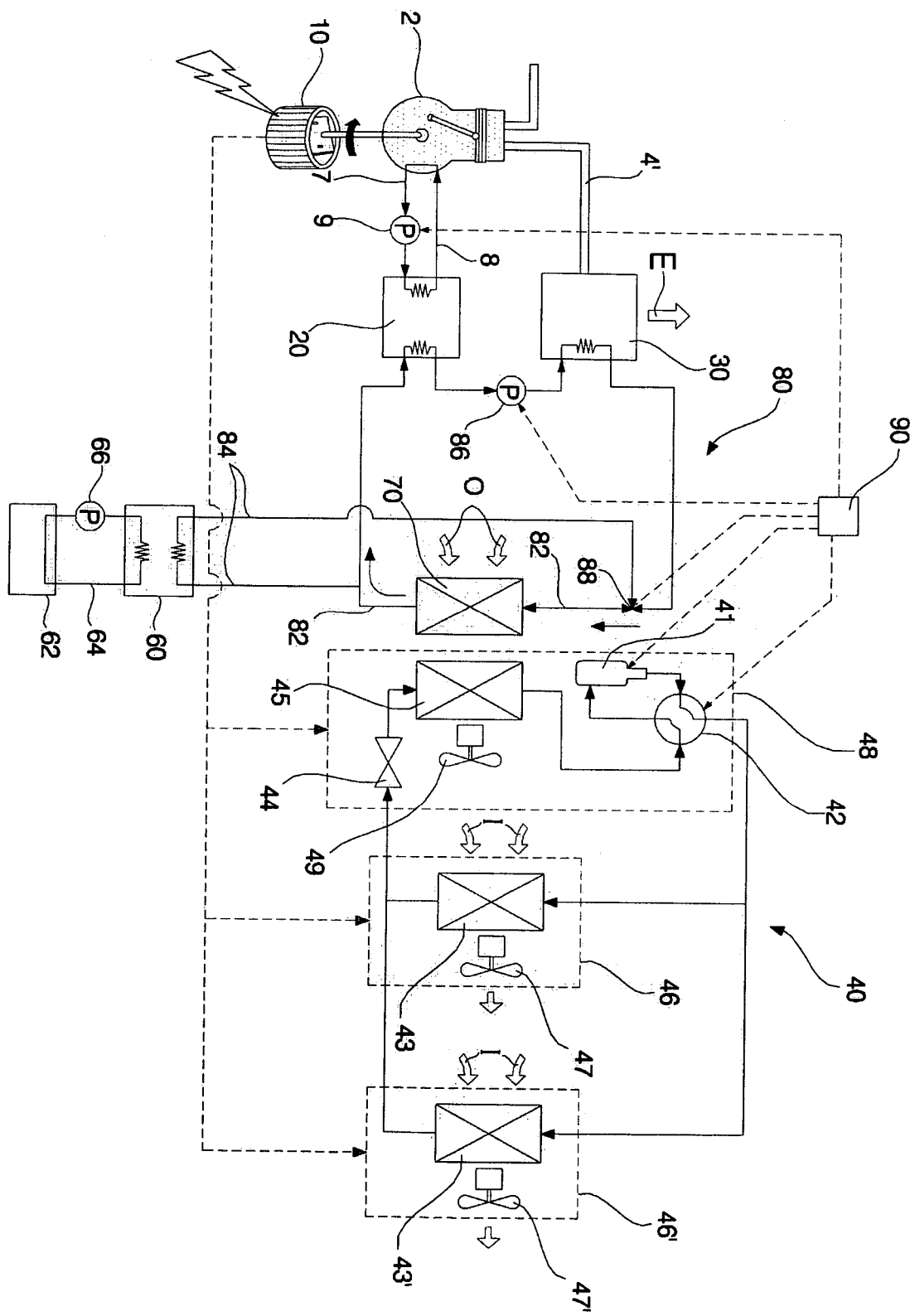
FIG. 5 is a schematic diagram of an electricity generating and air conditioning system with a water heater according to a third embodiment of the present invention, illustrating a state in which the system operates in a heating mode.
Figure 6:
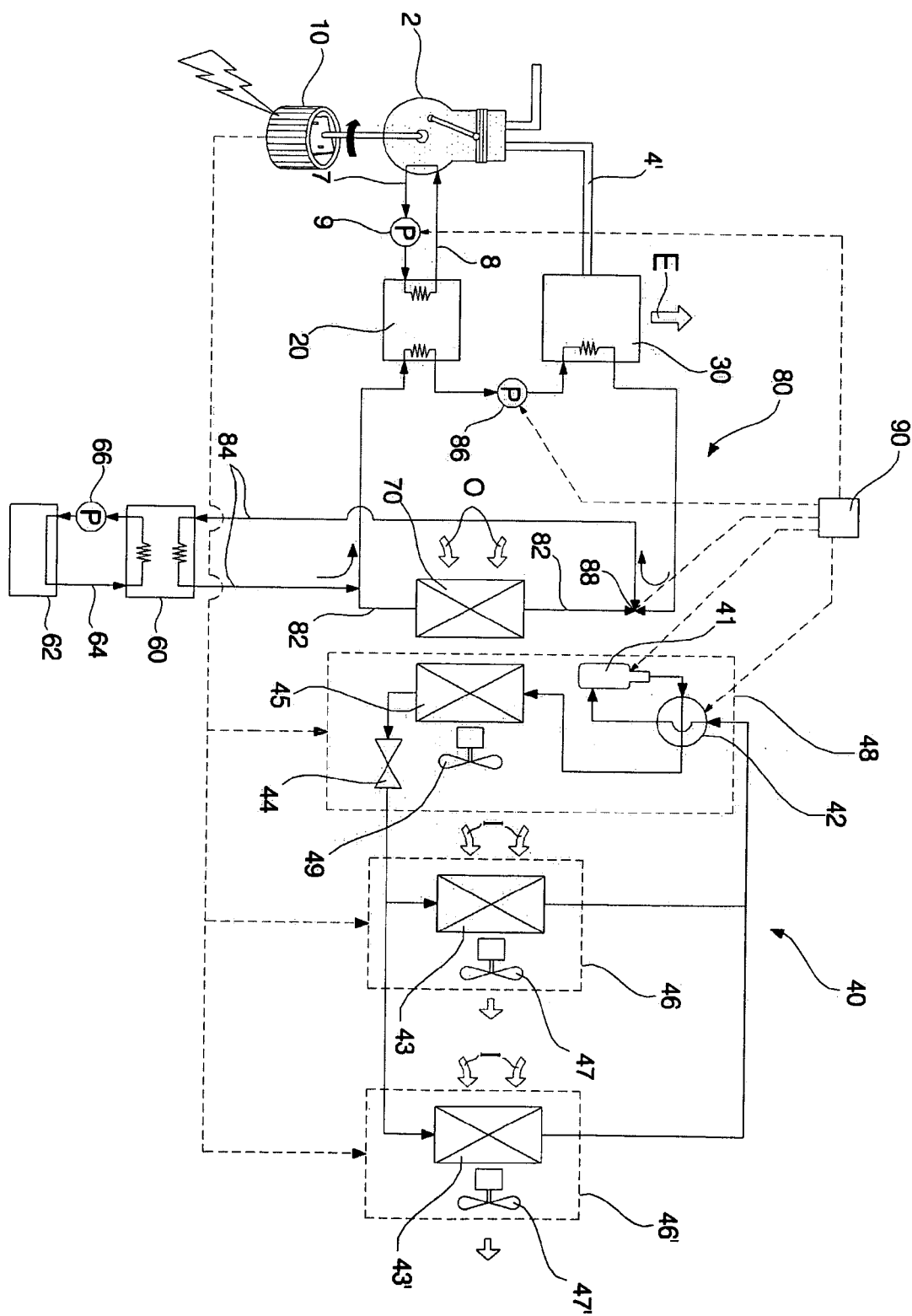
FIG. 6 is a schematic diagram of the electricity generating and air conditioning system with the water heater according to the third embodiment of the present invention, illustrating a state in which the system operates in a cooling mode.

FIG. 5 is a schematic diagram of an electricity generating and air conditioning system with a water heater according to a third embodiment of the present invention, illustrating a state in which the system operates in a heating mode. FIG. 6 is a schematic diagram of the electricity generating and air conditioning system with the water heater according to the third embodiment of the present invention, illustrating a state in which the system operates in a cooling mode.

As shown in FIGS. 5 and 6, the heat pump type air conditioner, that is, the heat pump type air conditioner 40, which is included in the electricity generating and air conditioning system, is of a multi-type. That is, the heat pump type air conditioner 40 includes a plurality of indoor units 46, 46'. . . , and a single outdoor unit 48. The indoor units 46, 46'. . . include indoor heat exchangers 43, 43'. . . , which are connected in parallel, respectively.

The indoor units 46, 46'. . . also include indoor blowers 47, 47'. . . , respectively.

The electricity generating and air conditioning system of this embodiment has the same configuration and functions as those of the first embodiment, except that the heat pump type air conditioner 40 includes a plurality of indoor units 46, 46' .... Accordingly, the constituent elements of the third embodiment respectively corresponding to those of the first embodiment are designated by the same reference numerals, and no detailed description thereof will be given.

Figure 7:
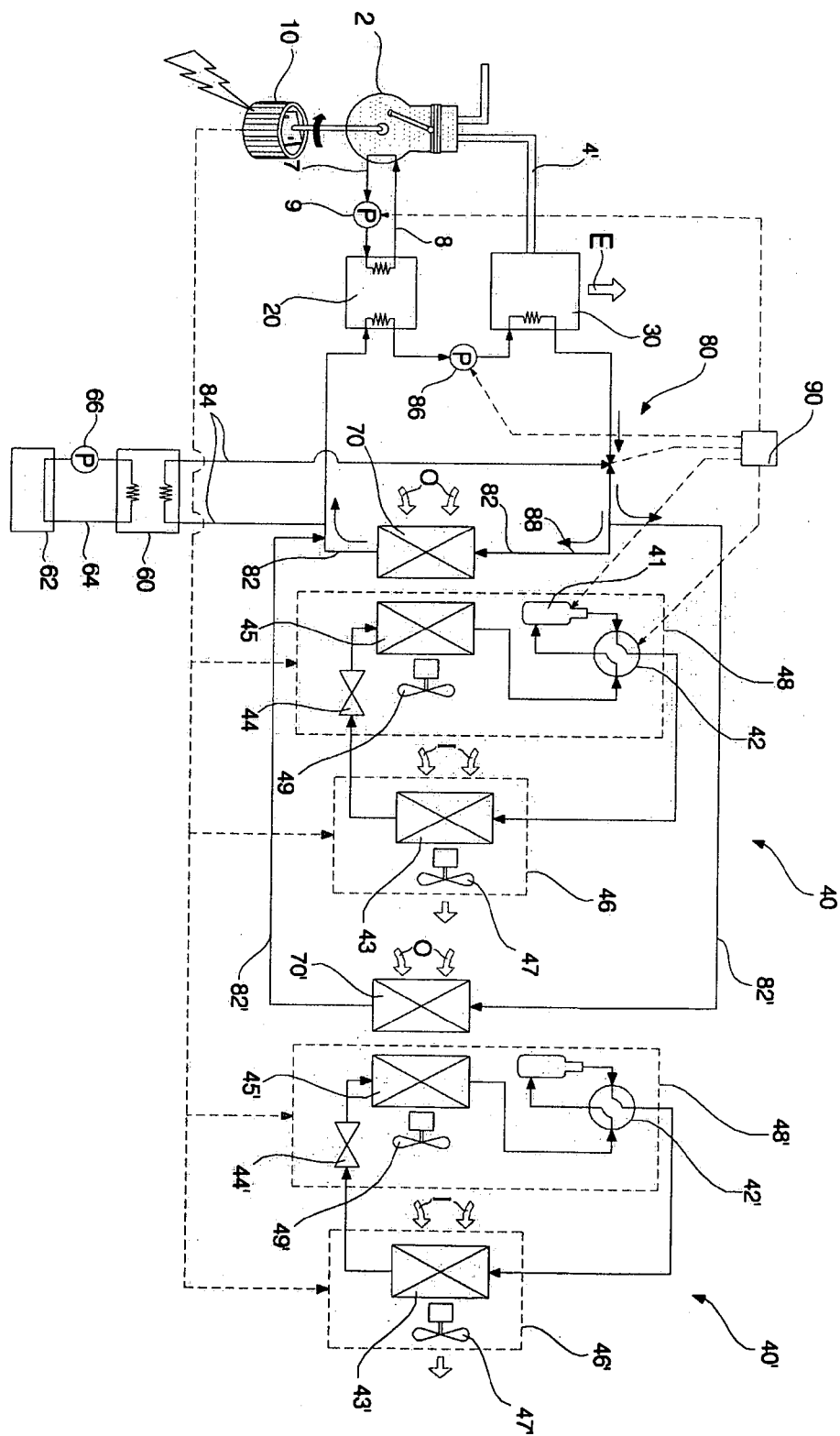
FIG. 7 is a schematic diagram of an electricity generating and air conditioning system with a water heater according to a fourth embodiment of the present invention, illustrating a state in which the system operates in a heating mode.
Figure 8:
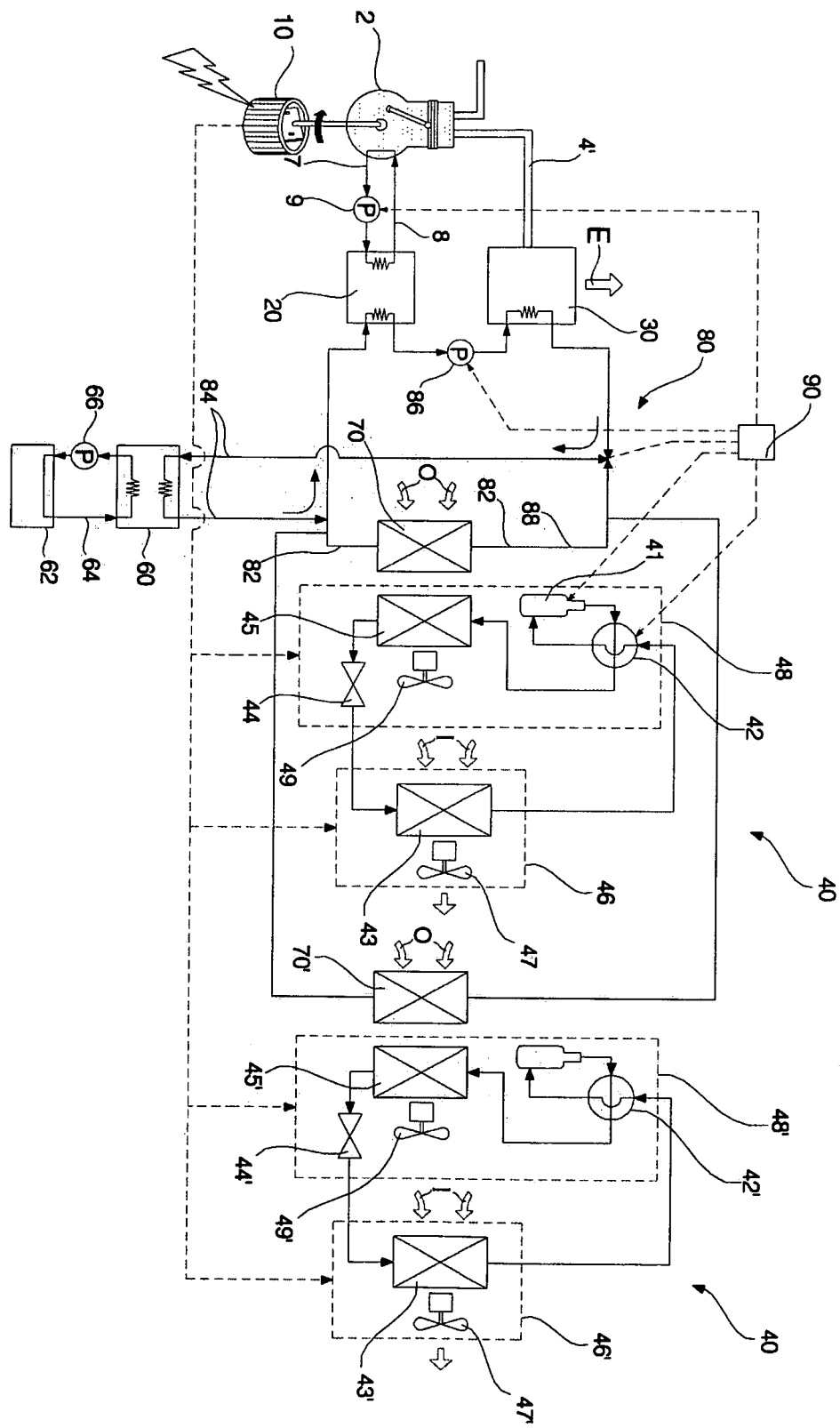
FIG. 8 is a schematic diagram of the electricity generating and air conditioning system with the water heater according to the fourth embodiment of the present invention, illustrating a state in which the system operates in a cooling mode.

FIG. 7 is a schematic diagram of an electricity generating and air conditioning system with a water heater according to a fourth embodiment of the present invention, illustrating a state in which the system operates in a heating mode. FIG. 8 is a schematic diagram of the electricity generating and air conditioning system with the water heater according to the fourth embodiment of the present invention, illustrating a state in which the system operates in a cooling mode.

As shown in FIGS. 7 and 8, the heat pump type air conditioner, that is, the heat pump type air conditioner 40, which is included in the electricity generating and air conditioning system, includes a plurality of indoor units 46, 46' ..., and a plurality of outdoor units 48, 48' ....

In the heat pump type air conditioner 40, refrigerant conduits respectively included in the indoor units 46, 46' ... may be connected in parallel. Refrigerant conduits respectively included in the outdoor units 48, 48' ... may also be connected in parallel. The following description will be given in conjunction with the case in which each of the outdoor units 48, 48' ... are connected to an associated one of the indoor units 46, 46' ... to constitute one air conditioner set, and each air conditioner set operates independently of other air conditioner sets.

The indoor units 46, 46' ... include respective indoor heat exchangers 43, 43' ..., and respective indoor blowers 47, 47' ....

The outdoor units 48, 48' ... include respective compressors 41, 41' ..., directional valves 42, 42' ..., respective expansion devices 44, 44' ..., respective outdoor heat exchangers 45, 45' ..., and respective outdoor blowers 49, 49' ....

Pre-heaters 70, 70' ... are arranged upstream from respective outdoor heat exchangers 45, 45' ... to pre-heat outdoor air blown to the outdoor heat exchangers 45, 45' ..., respectively.

Pre-heater circulation conduits 82, 82' ..., which are connected in parallel, are connected to respective pre-heaters 70, 70' ... to guide a heat medium to be circulated through the pre-heaters 70, 70' ....

The electricity generating and air conditioning system of this embodiment has the same configuration and functions as those of the first embodiment, except that the heat pump type air conditioner 40 includes a plurality of indoor units 46, 46' ..., a plurality of outdoor units 48, 48' ..., a plurality of pre-heaters 70, 70' ..., and a plurality of pre-heater circulation conduits 82, 82' .... Accordingly, the constituent elements of the fourth embodiment respectively corresponding to those of the first embodiment are designated by the same reference numerals, and no detailed description thereof will be given.

The electricity generating and air conditioning system with the water heater according to any one of the above-described embodiments of the present invention has various effects.

That is, the electricity generating and air conditioning system according to the present invention has an advantage in that the waste heat of the engine is used to heat water during a cooling operation of the heat pump type air conditioner, and is used to achieve an enhancement in heating performance during a heating operation of the heat pump type air conditioner, so that it is possible to achieve a reduction in heating load, and to maximize the efficiency of the system.

The electricity generating and air conditioning system according to the present invention also has advantages in that the waste heat of cooling water or exhaust gas of the engine is used to pre-heat air blown to the outdoor heat exchanger during the heating operation of the heat pump type air conditioner, so that it is possible to prevent the outdoor heat exchanger from being frosted, and to rapidly cope with the heating load of the heat pump type air conditioner.

In addition, the electricity generating and air conditioning system according to the present invention has advantages in that the water-heating heat exchanger circulation conduit is branched from the pre-heater circulation conduit such that only one heat medium conduit is provided for both the cooling water heat exchanger and the exhaust gas heat exchanger, so that the circulation conduit structure for the cooling water heat exchanger and exhaust gas heat exchanger is simple, and the number of control valves to be used for the circulation of the heat medium is minimized.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A cogeneration system comprising:
   an engine which generates heat during operation;
   a generator connected to an output shaft of the engine to generate electricity;
   a heat pump air conditioner, which comprises a compressor, a directional valve, an outdoor heat exchanger, an expansion device, and an indoor heat exchanger;
   a fluid-heating heat exchanger to heat a fluid;
   a pre-heater facing the outdoor heat exchanger; and
   waste heat recovering means for supplying the heat from the engine to the fluid-heating heat exchanger without supplying the heat to the pre-heater during a cooling operation of the heat pump air conditioner, and for supplying the heat to the pre-heater during a heating operation of the heat pump air conditioner such that the heat is transferred to the outdoor heat exchanger.

2. The system according to claim 1, wherein the heat pump air conditioner uses the electricity generated from the generator.

3. The system according to claim 1, wherein the waste heat recovering means comprises:
   a cooling fluid heat exchanger to absorb heat from cooling a second fluid used to cool the engine;
   an exhaust gas heat exchanger to absorb heat from exhaust gas discharged from the engine;
   heat transfer means to transfer the heat from at least one of the cooling fluid heat exchanger and the exhaust gas heat exchanger to the fluid heating heat exchanger without transferring the heat from the cooling fluid heat exchanger and the exhaust gas heat exchanger to the pre-heater during the cooling operation of the heat pump air conditioner, and to transfer the heat from at least one of the cooling fluid heat exchanger and the exhaust gas heat exchanger to the pre-heater during the heating operation of the heat pump air conditioner.

4. The system according to claim 3, wherein
the pre-heater pre-heats outdoor air blown toward the outdoor heat exchanger during the heating operation of the heat pump air conditioner.

5. The system according to claim 4, wherein the heat transfer means comprises:
a pre-heater circulation conduit to guide a heat medium to be circulated through the cooling fluid heat exchanger, the exhaust gas heat exchanger, and the pre-heater; and
a fluid heating heat exchanger circulation conduit to guide the heat medium to be circulated through the cooling fluid heat exchanger, the exhaust gas heat exchanger, and the fluid heating heat exchanger.

6. The system according to claim 5, wherein the fluid heating heat exchanger circulation conduit is branched from the pre-heater circulation conduit.

7. The system according to claim 5, wherein the heat transfer means further comprises:
a heat medium circulation pump to pump the heat medium, and thus, to circulate the heat medium through the pre-heater circulation conduit or through the fluid heating heat exchanger circulation conduit.

8. The system according to claim 5, wherein the heat transfer means further comprises:
a control valve to alternately open/close the pre-heater circulation conduit and the fluid heating heat exchanger circulation conduit, and thus, to circulate the heat medium through a selected one of the pre-heater circulation conduit and the fluid heating heat exchanger circulation conduit.

9. The system according to claim 8, wherein the heat transfer means further comprises:
a controller to control the control valve to operate, during the cooling operation of the heat pump air conditioner, in a cooling mode in which the fluid heating heat exchanger circulation conduit is opened, and the pre-heater circulation conduit is closed, and to control the control valve to operate, during the heating operation of the heat pump air conditioner, in a heating mode in which the fluid heating heat exchanger circulation conduit is closed, and the pre-heater circulation conduit is opened.

10. The system according to claim 1, wherein at least one of the engine, the generator, the indoor heat exchanger, and the outdoor heat exchanger comprises a plurality of ones.

11. The system according to claim 1, wherein the fluid is a liquid.

12. The system according to claim 11, wherein the liquid is water.

13. The system according to claim 12, wherein the fluid heating heat exchanger is connected to a hot water consumer via a hot water conduit.

14. The system according to claim 1, wherein the waste heat recovering means stops supplying the heat to the fluid-heating heat exchanger during the heating operation of the heat pump air conditioner.

15. A cogeneration system comprising:
an engine;
a generator connected to an output shaft of the engine to generate electricity;
a cooling fluid heat exchanger to absorb heat from cooling a first fluid used to cool the engine;
an exhaust gas heat exchanger to absorb heat from exhaust gas discharged from the engine;
a heat pump air conditioner, which uses the electricity generated from the generator, and comprises a compressor, a directional valve, an outdoor heat exchanger, an expansion device, and an indoor heat exchanger;
a fluid-heating heat exchanger to heat a second fluid;
a pre-heater to pre-heat outdoor air blown toward the outdoor heat exchanger; and
heat transfer means to transfer the heat from at least one of the cooling fluid heat exchanger and the exhaust gas heat exchanger to the fluid heating heat exchanger without transferring the heat from the cooling fluid heat exchanger and the exhaust gas heat exchanger to the pre-heater during a cooling operation of the heat pump air conditioner, and to transfer the heat from at least one of the cooling fluid heat exchanger and the exhaust gas heat exchanger to the pre-heater during a heating operation of the heat pump air conditioner.

16. The system according to claim 15, wherein the heat transfer means comprises:
a pre-heater circulation conduit to guide a heat medium to be circulated through the cooling fluid heat exchanger, the exhaust gas heat exchanger, and the pre-heater; and
a fluid heating heat exchanger circulation conduit to guide the heat medium to be circulated though the cooling fluid heat exchanger, the exhaust gas heat exchanger, and the fluid heating heat exchanger.

17. The system according to claim 16, wherein the fluid heating heat exchanger circulation conduit is branched from the pre-heater circulation conduit.

18. The system according to claim 16, wherein the heat transfer means further comprises:
a heat medium circulation pump to pump the heat medium, and thus, to circulate the heat medium through the pre-heater circulation conduit or through the fluid heating heat exchanger circulation conduit.

19. The system according to claim 16, wherein the heat transfer means further comprises:
a control valve to alternately open/close the pre-heater circulation conduit and the fluid heating heat exchanger circulation conduit, and thus, to circulate the heat medium through a selected one of the pre-heater circulation conduit and the fluid heating heat exchanger circulation conduit.

20. The system according to claim 19, wherein the heat transfer means further comprises:
a controller to control the control valve to operate, during the cooling operation of the heat pump air conditioner, in a cooling mode in which the fluid heating heat exchanger circulation conduit is opened, and the pre-heater circulation conduit is closed, and to control the control valve to operate, during the heating operation of the heat pump air conditioner, in a heating mode in which the fluid heating heat exchanger circulation conduit is closed, and the pre-heater circulation conduit is opened.

21. The system according to claim 15, wherein at least one of the engine, the generator, the indoor heat exchanger, the outdoor heat exchanger, and the pre-heater comprises a plurality of ones.

22. The system according to claim 15, wherein each of the first fluid and the second fluid is a liquid.

23. The system according to claim 22, wherein the liquid is water.

24. The system according to claim 15, wherein the heat transfer means stops supplying the heat to the fluid-heating heat exchanger during the heating operation of the heat pump air conditioner.

25. A cogeneration system comprising:

an engine;

a generator connected to an output shaft of the engine to generate electricity;

a cooling fluid heat exchanger to absorb heat from cooling a first fluid used to cool the engine;

an exhaust gas heat exchanger to absorb heat from exhaust gas discharged from the engine;

a heat pump air conditioner, which uses the electricity generated from the generator, and comprises an outdoor unit including a compressor, a directional valve, an outdoor heat exchanger, and an expansion device, and an indoor unit including an indoor heat exchanger;

a fluid-heating heat exchanger to heat a second fluid;

a pre-heater to pre-heat outdoor air blown toward the outdoor heat exchanger; and heat transfer means to transfer the heat from at least one of the cooling fluid heat exchanger and the exhaust gas heat exchanger to the fluid heating heat exchanger without transferring the heat from the cooling fluid heat exchanger and the exhaust gas heat exchanger to the pre-heater during a cooling operation of the heat pump air conditioner, and to transfer the heat from at least one of the cooling fluid heat exchanger and the exhaust gas heat exchanger to the pre-heater during a heating operation of the heat pump air conditioner.

26. The system according to claim 25, wherein at least one of the engine, the generator, the indoor heat exchanger, the outdoor heat exchanger, and the pre-heater comprises a plurality of ones.

27. The system according to claim 25, wherein each of the first fluid and the second fluid is a liquid.

28. The system according to claim 27, wherein the liquid is water.

29. The system according to claim 25, wherein the heat transfer means stops supplying the heat to the fluid-heating heat exchanger during the heating operation of the heat pump air conditioner.

* * * * *